3,631,144
VISCOSITY BUILDUP OF POLYESTER RESINS
William H. Deis, Belmont, and Gerald Bohm, Albany, Calif., assignors to Merck & Co., Inc., Rahway, N.J.
No Drawing. Continuation of application Ser. No. 833,750, June 16, 1969. This application May 19, 1970, Ser. No. 37,481
Int. Cl. C08f 21/02
U.S. Cl. 260—40 R                                     6 Claims

ABSTRACT OF THE DISCLOSURE

A polyester resin system possessing a rapid viscosity buildup is produced by combining with said resin (1) magnesium hydroxide and (2) a potentiating agent, said agent being a liquid polyol.

CROSS REFERENCES TO RELATED APPLICATIONS

This application is a continuation of pending United States application Ser. No. 630,810, filed Apr. 14, 1967.

SUMMARY

This invention concerns a novel polyester resin system containing a polyester resin, magnesium hydroxide and a potentiating agent and a process for preparing said novel polyester resin system. More particularly, this invention concerns a polyester resin system which undergoes a rapid increase in viscosity at ambient temperature and a method for preparing this resin system.

Polyester resins find use in the preparation of various articles of manufacture such as appliances, boats, automotive parts, and devices for electrical equipment. During the preparation of such articles, it has been found desirable to impart additional physical properties to the polyester resin used so as to permit efficient and technically superior production techniques. The use of a polyester-$Mg(OH)_2$ composition which rapidly increases in viscosity is an important factor in permitting the desired production techniques. The more rapid increase of viscosity permits the resulting thickened polyester to be used sooner after mixing and thereby reduces the amount of material held in inventory; this affords production economies.

It is an aspect of this invention to provide $Mg(OH)_2$ in combination with a potentiating agent such that its addition to polyester resin causes a surprisingly rapid viscosity increase in the composition obtained. A further object is a method of making a polyester composition having improved properties. It is another object of this invention to provide an improved polyester composition containing $Mg(OH)_2$ combined with a potentiating agent to insure a surprisingly beneficial viscosity-time relationship. Other objects will become apparent from the following description of the invention.

Hitherto attempts to increase the viscosity of polyester resin by the use of $Mg(OH)_2$ have proved unsuccessful. U.S. Pat. 2,628,209 reports that 1–10 parts of $Mg(OH)_2$ shows no tendency to thicken 100 parts of resin on standing at room temperature. The present invention is based upon the discovery that the addition of $Mg(OH)_2$ and a potentiating agent to a general purpose polyester resin system results in an unexpected, highly desirable rapid increase in viscosity.

The particular form of the $Mg(OH)_2$ employed in the present invention is not critical and any commercially available $Mg(OH)_2$ product can be effectively utilized. Examples of such products are Marinco H 1241 and Marinco H 1211. About 0.2–20.0 weight percent and preferably 5.0–15.0 weight percent of $Mg(OH)_2$ may be employed. The amount of $Mg(OH)_2$ is not critical, however, and other values may be used if desired.

The potentiating agents that are employed in the practice of the invention are characterized as aliphatic monocarboxylic acids of up to 7 carbon atoms and polyols which are liquid at room temperature. The amount of potentiator employed is not critical, being simply that amount which accelerates the viscosity buildup to the desired degree. The amount employed shall usually vary within the range of 0.1–5.0 weight percent depending upon the particular polyester resin and type and amount of magnesium hydroxide employed. Examples of potentiating agents that may be used are acetic acid, acrylic acid, propionic acid, ethylene glycol, glycerol and sorbitol.

In accordance with this invention, the $Mg(OH)_2$ and potentiating agent described above are blended with polyester resin. The resulting material, a thickened polyester resin, has desirable physical characteristics, particularly the ability to attain high viscosity in a relatively short time. For instance, certain of the thickened polyester resins of the present invention attain viscosities of 220 poise at room temperature in about 20 hours, whereas otherwise identical thickened polyesters containing other well-known thickening agents may require about 5 days to attain this same viscosity.

It is well known that the thickening of polyester resins can be accomplished by the addition of powdered fillers in considerable bulk. However, the use of bulk fillers results in resins which are opaque and, accordingly, greatly limited in application. In contrast, by the addition of relatively small amounts of the $Mg(OH)_2$-potentiator preparation, it is possible to achieve the highly desirable increase in viscosity without suffering loss in clarity. The resins that are produced as a result of the present invention are clear and transparent after polymerization. Where clarity is not a requirement, the resin compositions of this invention may also contain fillers such as are normally used in the art for making articles prepared from polyesters. Such fillers include barytes, ground silica, magnesium carbonate, diatomaceous earth, glass fiber, hydrated alumina, and the like. The novel compositions of matter which are here called thickened polyesters are particularly useful in the preparation of objects and articles of manufacture where low tackiness and smooth finishes are desired.

The $Mg(OH)_2$ is conveniently incorporated into polyester resin by intimately admixing it with the polyester using a high-speed, high-shear mixer. The magnesium hydroxide may also be admixed with a vehicle to form a dispersion. A Cowles Dissolver is useful in preparing such dispersions. A dry form of the $Mg(OH)_2$ may also be added to the polyester. The $Mg(OH)_2$ is readily admixed with the polyester using a laboratory stirrer operating at about 4–6,000 revolutions per minute. The entire mixing procedure may take place at room temperature. The potentiating agent is ordinarily dispersed in the resin before the addition of the $Mg(OH)_2$, however, it may be incorporated into the resin at the same time the magnesium hydroxide is added.

The polyester starting materials employed in this invention are polymerizable resin compositions derived from the product obtained by dissolving a precondensed linear polymer in a monomeric polymerizable compound containing an ethylenic bond and capable of cross-linking the linear polymer into a rigid three-dimensional gel. The linear polymer is a polymeric ester produced by the recurring condensation of a dicarboxylic acid (aromatic or ethylenic) with a polyol such as propylene glycol or glycerol. The monomeric polymerizable compound used for cross-linking contains an ethylenic grouping, preferably attached to a phenyl group as in styrene, alpha-methyl styrene or divinyl benzene. As examples of some of the resins within the above description there may be mentioned Stypol 40-2417; Selectron RS 5003, Selectrol 5156, Selectron 50012, Selectron RS 5119; Plaskon 9520 and PE464; Polylite 8000 and Vibrin 156R.

When admixed with the $Mg(OH)_2$-potentiator system of the present invention, the above polyesters provide a composition having enhanced physical properties particularly beneficial in the production of various articles of manufacture. This composition is of sufficiently low viscosity shortly after precipitation to completely wet a filler. Furthermore, the viscosity is of an order as to wet out a reinforcing material such as fibreglass. Thereafter, the novel potentiated polyester-$Mg(OH)_2$ composition becomes highly viscous, permitting easy handling, ready storage and convenient use of direct molding techniques. The obtaining of this highly viscous thickened polyester at an enhanced rate permits substantial savings of both time and expense during the preparation of the molded articles.

The reason for the surprising viscosity increase in the thickened polyester resin is not clearly understood. Although it is not desired to limit the invention to any particular theory, it is believed that physical phenomena, such as colloidal effects or gelling, imparts some of the unusual viscosity characteristics to the thickened polyester compositions of this invention. Furthermore, the reaction of the $Mg(OH)_2$ with the carboxy groups of the polyester may result in a cross-linking effect thereby producing a polyester of higher molecular weight and hence a higher viscosity.

The following examples are given for the purpose of illustration and not by way of limitation:

EXAMPLE I

The potentiating agent, $Mg(OH)_2$ and resin are blended together using a high speed propellor mixer. The $Mg(OH)_2$ used was Marinco H1241. The compositions containing the potentiating agent and the preparations containing only $Mg(OH)_2$ are allowed to stand at ambient temperature and the viscosity measured. Table I below illustrates the decided thickening effect produced by those compositions which contain glycerol or ethylene glycol as a potentiating agent in comparison with the system containing only $Mg(OH)_2$. Two parts of Marinco H and one part of potentiating agent are employed per hundred parts of polyester resin.

Vibrin 156R is a condensation product of maleic anhydride and an ether glycol subsequently mixed with 30% styrene monomer. In addition, quinone inhibitors are included to prevent premature gelation. PE464 is an unsaturated polyester resin made from phthalic and maleic anhydrides, propylene glycol and an unsaturated vinyl monomer.

TABLE

| Resin 100 | | Vibrin 156R | | PE 464 |
|---|---|---|---|---|
| Marinco H | 2 | 2 | 2 | 2 |
| Glycerol | 1 | | | |
| Ethylene glycol | | | 1 | |
| Brookfield viscosity, cps. after: | | | | |
| 1 hour, 26° C | 28 | 28 | 23 | 23 |
| 4 hours, 26° C | 32 | 30 | 28 | 26 |
| 8 hours, 26° C | 35 | 29 | 31 | 26 |
| 1 day, 24° C | 55 | 35 | 77 | 31 |
| 2 days, 24° C | 81 | 36 | 185 | 30 |
| 5 days, 22° C | 364 | 41 | 490 | 36 |
| 8 days, 24° C | 308 | 41 | 752 | 36 |
| 14 days, 19° C | 980 | 46 | 740 | 35 |

What is claimed is:

1. A substantially thickened thermosetting resin composition consisting essentially of:
   (A) An unsaturated polyester comprising the reaction product of an ethylenically unsaturated polycarboxylic acid and a polyhydric alcohol.
   (B) An ethylenically unsaturated monomer copolymerizable with the polyester.
   (C) A chemical thickening agent consisting of magnesium hydroxide,
   (D) A liquid polyol selected from the group consisting of glycerol, sorbitol and ethylene glycol, the amount of polyol being about 0.1–5 percent by weight of the total weights of components (A) and (B).

2. The composition of claim 1 which contains about 5.0–15.0 weight percent of $Mg(OH)_2$ and about 0.1–5.0 weight percent of polyol.

3. The composition of claim 1 which further contains a filler material.

4. A process of rapidly and substantially increasing the viscosity of polyester resin compositions which comprises intimately admixing at ambient temperatures of about 0.2–20.0 weight percent of $Mg(OH)_2$ and about 0.1–5.0 weight percent of a potentiating agent said agent being a liquid polyol selected from the group consisting of glycerol, sorbitol and ethylene glycol, to said resin composition, wherein said resin is a mixture of unsaturated polyesters and vinyl monomers, the unsaturated polyesters comprising the polymeric condensation reaction product of ethylenically unsaturated dicarboxylic acids and polyols.

5. The process of claim 4 which contains about 5.0–15.0 weight percent of $Mg(OH)_2$ and about 0.1–5.0 weight percent of potentiating agent.

6. The process of claim 4 which further contains a filler material.

References Cited

UNITED STATES PATENTS 3,373,129   3/1968   Kori et al.
3,432,458   3/1969   Kwan et al.

WILLIAM H. SHORT, Primary Examiner

R. J. KOCH, Assistant Examiner

U.S. Cl. X.R.

260—864, 865